March 25, 1958     M. M. HERRING     2,828,166
EMPENNAGE STAND FOR AIRCRAFT
Filed Sept. 1, 1955     8 Sheets-Sheet 1

INVENTOR.
MATTHEW M. HERRING
BY
ATTORNEY

March 25, 1958   M. M. HERRING   2,828,166
EMPENNAGE STAND FOR AIRCRAFT
Filed Sept. 1, 1955   8 Sheets-Sheet 3

INVENTOR.
MATTHEW M. HERRING
BY
ATTORNEY

March 25, 1958 M. M. HERRING 2,828,166
EMPENNAGE STAND FOR AIRCRAFT
Filed Sept. 1, 1955 8 Sheets-Sheet 5

INVENTOR.
MATTHEW M. HERRING
BY
ATTORNEY

INVENTOR.
MATTHEW M. HERRING
BY
Salvatore G. Militano,
ATTORNEY

INVENTOR.
MATTHEW M. HERRING
BY
ATTORNEY

March 25, 1958 — M. M. HERRING — 2,828,166
EMPENNAGE STAND FOR AIRCRAFT
Filed Sept. 1, 1955 — 8 Sheets-Sheet 8

INVENTOR.
MATTHEW M. HERRING
BY
ATTORNEY

United States Patent Office 2,828,166
Patented Mar. 25, 1958

2,828,166

EMPENNAGE STAND FOR AIRCRAFT

Matthew M. Herring, Miami, Fla., assignor to Aircraftsmen, Inc., Miami, Fla., a corporation of Florida Application September 1, 1955, Serial No. 531,857

2 Claims. (Cl. 304—29)

This invention relates to portable scaffolds and is more particularly directed to a portable empennage stand for aircraft.

At frequent intervals, the outer surfaces of aircrafts must be washed, cleaned, polished and the plane itself generally maintained and inspected. However, due to the advent of large sized aircraft, this service has been accomplished in a haphazard manner utilizing the ordinary equipment at hand, such as ladders, trucks, and make-shift scaffolding in order to attain sufficient height for reaching the various parts of the aircraft. This method has been highly inefficient at best, giving rise to unsafe conditions for the workmen involved and resulting in abnormally high labor costs.

The stand which is the subject matter of this invention is portable and constructed in sections so that it may be readily disassembled and transported by aircraft wherever needed. It stands higher than the aircraft that it services and has mounted thereon a pair of cantilever type catwalks or elevators with an electric switch on each catwalk to permit the positioning of the individual catwalks at any desired elevation. The catwalks are mounted in spaced relation to each other thereby permitting a catwalk to be positioned on each side of the rudder and the upright tail portions of the aircraft, so that the work to be done on those surfaces is accomplished very easily and in comfort and safety to the workmen. Also the catwalks are pivotally mounted on the stand to permit the swinging of the catwalks in a horizontal plane to any desired position. This brings within easy reach such parts of the aircraft as the upper and lower surfaces of the stabilizers and elevators including the extreme tips thereof without having to constantly move or change the position of the stand. Also, by pivoting the catwalks to their extreme outward position, they may become aligned to form a continuous catwalk to facilitate the cleaning or otherwise servicing the broad expanse of the aircraft fusilage.

Therefore, a principal object of the present invention is to provide a portable stand for maintenance, cleaning, polishing and servicing the tail surfaces of an aircraft, which stand provides a pair of vertically movable and horizontally swingable catwalks or platforms thereby placing all of the surfaces of an aircraft within easy reach of workmen standing on the catwalks.

A further object of the present invention is to provide an empennage stand for aircraft described as above which is safe for the workmen using the stand and extremely efficient in its operation.

A further object of the present invention is the provision of an empennage stand for aircraft characterized as above which has reduced considerably the cost of washing, cleaning, and maintenance of the tail surfaces of an aircraft and the work itself more easily accomplished by the workmen.

A still further object of the present invention is the provision of an empennage stand for aircraft described as above which has a hoist mounted thereon for removing or replacing the rudder or other tail structure from an aircraft.

A still further object of the present invention is to provide an empennage stand for aircraft constructed in sections in order to permit the ready disassembly of the stand for shipping by aircraft and the assembling of the stand at its destination for use in the maintenance of aircraft.

A still further object of the present invention is the provision of an empennage stand described as above which are provided with switches, electrical junction boxes and hose connections for water, chemicals and the like at the various levels on the stand for the convenience of the workmen on the platforms and whose platforms are individually and independently operated.

The invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 11 is a fragmentary sectional view taken along the line 11—11 in Figure 1.

Figure 12 is a cross sectional view taken along the line 12—12 in Figure 11.

Figure 13 is a fragmentary sectional view taken along the line 13—13 in Figure 1.

Figure 5:
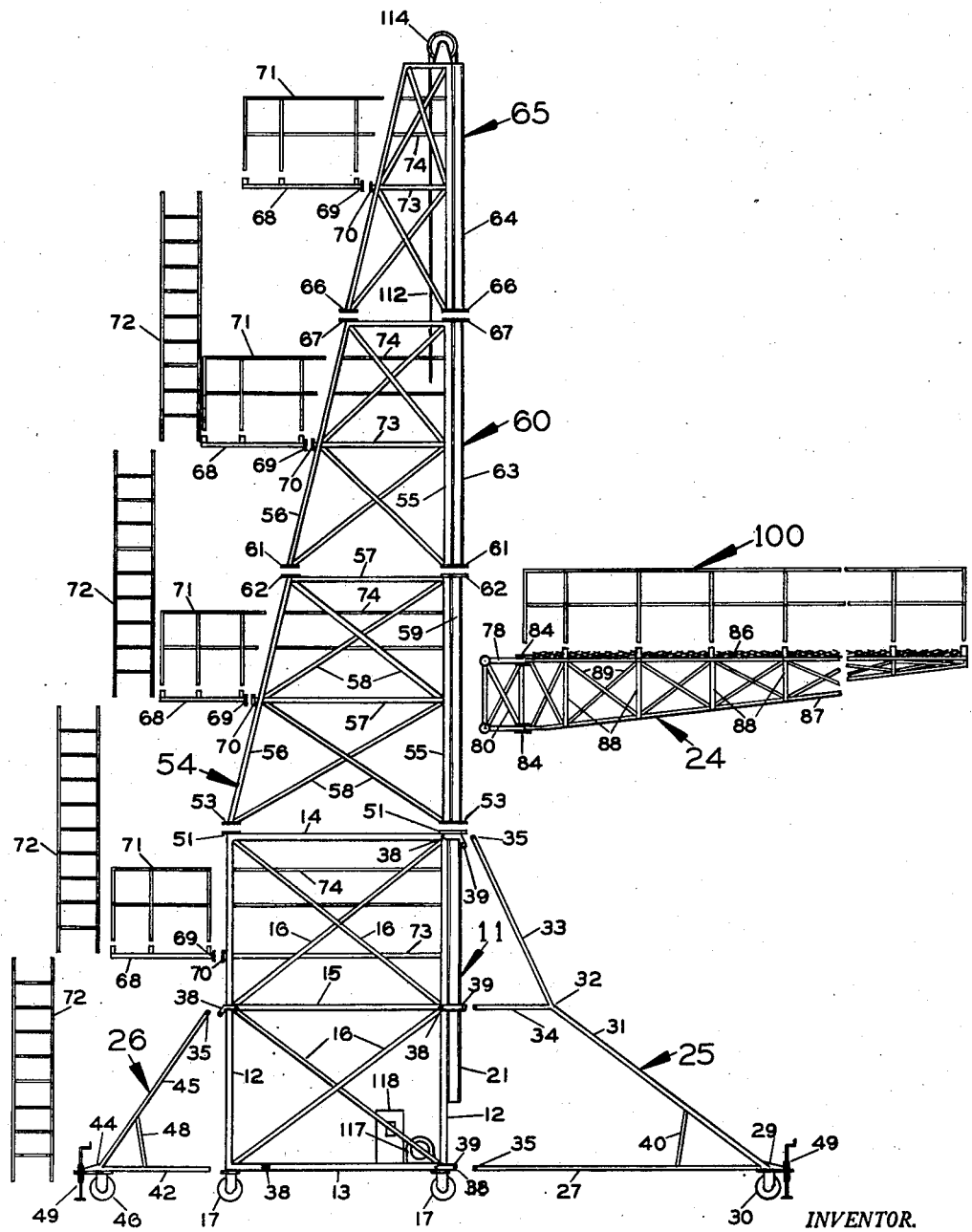
Figure 5 is an exploded side elevational view.

Referring to the accompanying drawings, wherein like numerals are used to designate similar parts throughout the several views, the numeral 10 refers generally to the empennage stand for aircraft constructed of tubular members though angle iron or any other suitable material may be used. The stand 10 is constructed in sections for the purpose of facilitating the transportation thereof as best shown by Figure 5, each of the sections being bolted together to form the completed unit. A base section 11 formed into a substantially box-like shape consists of upright members 12 positioned at each corner, joined together by horizontal members 13 and 14 at the base and top respectively of the upright members 12 and horizontal members 15 at approximately the midsection of the upright members 12. To further strengthen the base section 11, cross braces 16, 16 which extend from the top and bottom horizontal members 14 and 13 respectively to the horizontal members 15 are mounted on each side of the base section 11. A supporting wheel 17 is suitably swivelled to the lower surface of the base section 11 at the corners thereof, which wheels 17 serve to support the stand 10 at all times and permit the rolling of the stand 10 from one position about an aircraft to another.

Figure 3:
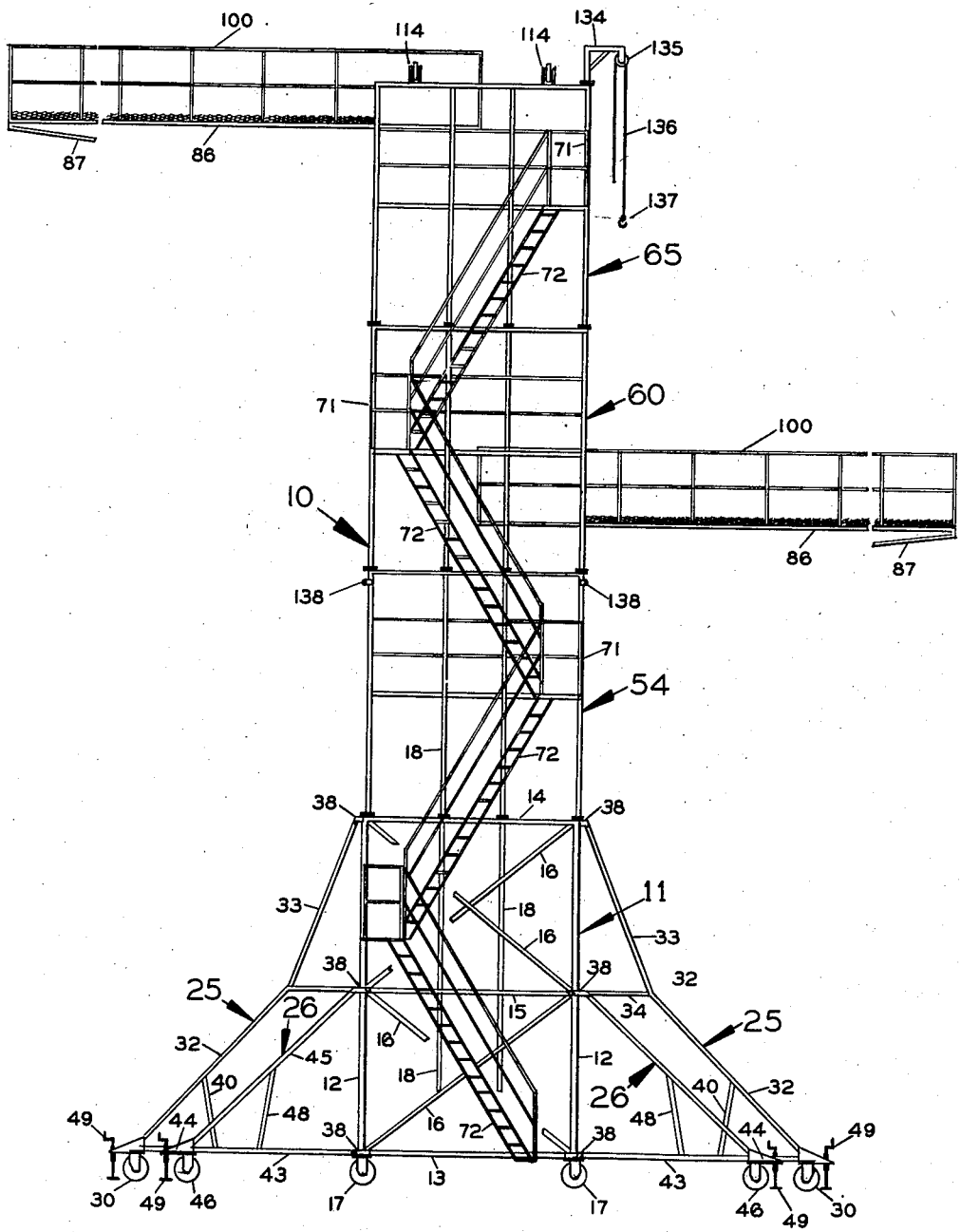
Figure 3 is a rear elevational view with the catwalks shown pivoted to their extreme sidewise position.

On the forward side of the base section 11 there is a further pair of upright members 18 (see Figure 3) which terminate short of the horizontal member 13 with cross braces 19 and 20 extending diagonally from the corners of the section 11 to the members 18. The pair of upright members 18 and the two corner upright members 12 on the forward side of the base section 11 form a support for tracks 21 which extend and are secured along the length thereof to a position removed from the horizontal member 13. The tracks 21 of U-shaped cross section are welded or otherwise secured to the upright members 12 to form two sets of tracks, each set for a vertically movable platform or catwalk 24 whose construction and function are explained in detail hereinafter.

In order to provide the stand 10 with increased stability against tipping, the base portions of the base section 11 are broadened by virtue of extensible leg portions 25 and 26 demountably mounted at the front and rear corners respectively to the base section 11. The leg portions 25 consist of horizontal members 27 and 28 joined at one end as at 29 where a wheel 30 identical to wheels 17 are swively mounted for supporting the legs 25. Also from the end portion 29 of the members 27, 28 there extends a diagonal member 31 at whose inner end 32 a further diagonal member 33 is secured extending to the horizontal members 14. A horizontal brace member 34 extends from the position 32 to the horizontal member 15. On each of the horizontal members 13, 14 and 15 at the front corners of the base section 11 there is a pair of spaced apart lugs 38 with a bore 39 extending therethrough, the lugs 38 receive therebetween the free ends of the leg members 27, 28, 33 and 34 (see Figure 13) which are likewise provided with a bore 35. A pin 36 extends through the aforementioned bores 35 and 39 locking the front extensible legs 25 in position. Cross braces 40 and 41 serve to strengthen the structure of the extensible legs 25. The rear legs 26 substantially similar to the front legs 25 are likewise provided with horizontal members 42 and 43 joined at their outer ends as at 44 and whose inner ends are removably secured by pins 36 to lugs 38 welded to the horizontal members 13. A diagonal member 45 welded at one end to the ends 44 of the horizontal members 42, 43 extends to the horizontal members 15 of the base section 11. The upper end of the member 45 is provided with a bore 35 to receive a pin 36 when the member 45 is placed in the lug 38 secured to the member 15 for removably securing the extensible leg 26. A wheel 46 is mounted at the free end 44 of the members 42, 43 for supporting the extensible legs 26. Braces 47 and 48 further strengthen the legs 26. Adjacent each of the wheels 30 and 46 there is mounted a conventional levelizing jack 49 which is adapted to raise or lower the wheel off or onto the pavement. Also, a tow bar 50 is pivotally mounted on the horizontal member 13 at the forward and rear sides of the base section 11.

On the top of each of the upright members 12 there is welded or otherwise secured a horizontal plate member 51 (see Figures 5 and 11) about whose periphery is a plurality of bores to receive bolts 52 which secure thereto a similar plate member 53 of intermediate section 54. Upright members 55 and 56 which form the corners of the intermediate section 54 extend upwardly of the plate members 53, the members 56 being inclined slightly in a direction toward the front of stand 10. The intermediate section 54 is provided with horizontal members 57 which extend along the midportion and top of the upright members 55 and 56 and cross braces 58, extending from the midsection of the upright members 55 and 56 to the opposite ends thereof. On the front side of the intermediate section 54 there are two pairs of tracks 59 which are in vertical alignment and identical in construction with the tracks 21 of the base section 11. Mounted on the intermediate section 54 in the same manner as the intermediate section 54 is mounted on the base section 11 is a further intermediate section 60 which is identical in construction with section 54 except as to the width of the sides of the sections since the rear upright tubular members 56 are inclined toward the front of the stand 10 and the sides decrease in width in an upward direction. Section 60 is removably secured to section 54 by securing plates 61 which are bolted to the securing plates 62 of section 54. Likewise, top section 65 which is similar in construction with the intermediate sections 54, 60 is provided with securing plates 66 that are bolted to securing plates 67 mounted on the upright members 55, 56 of the intermediate section 60.

Sections 60 and 65 are each provided with tracks 63 and 64 respectively on the front side thereof, which tracks are in alignment with each other and with tracks 59 and 21 and together extend from adjacent the bottom of the section 11 to the top of section 65.

Figure 1:
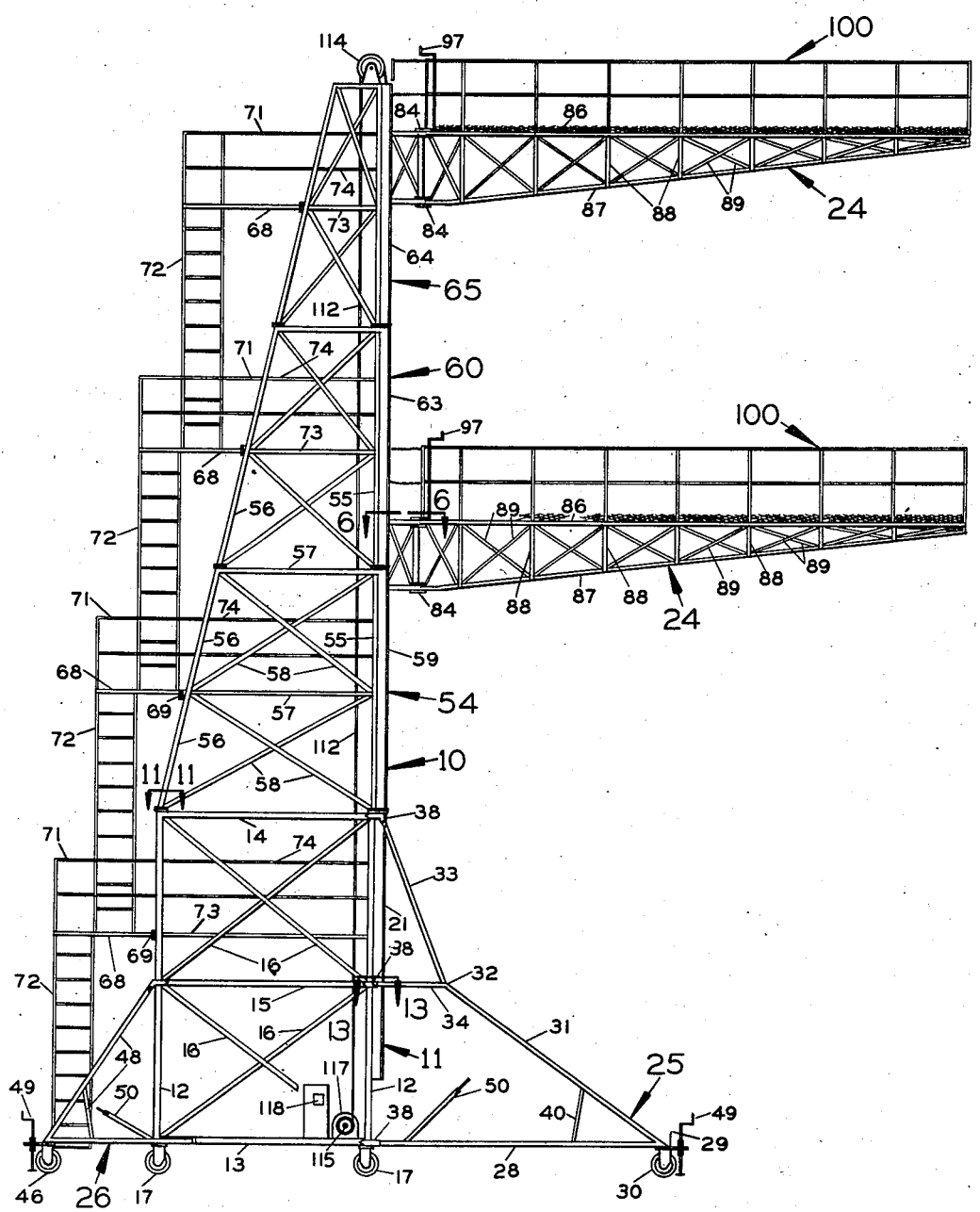
Figure 1 is a side elevational view of an empennage stand for aircraft embodying my invention with catwalks shown positioned at different levels and extending in a forward direction.
Figure 2:
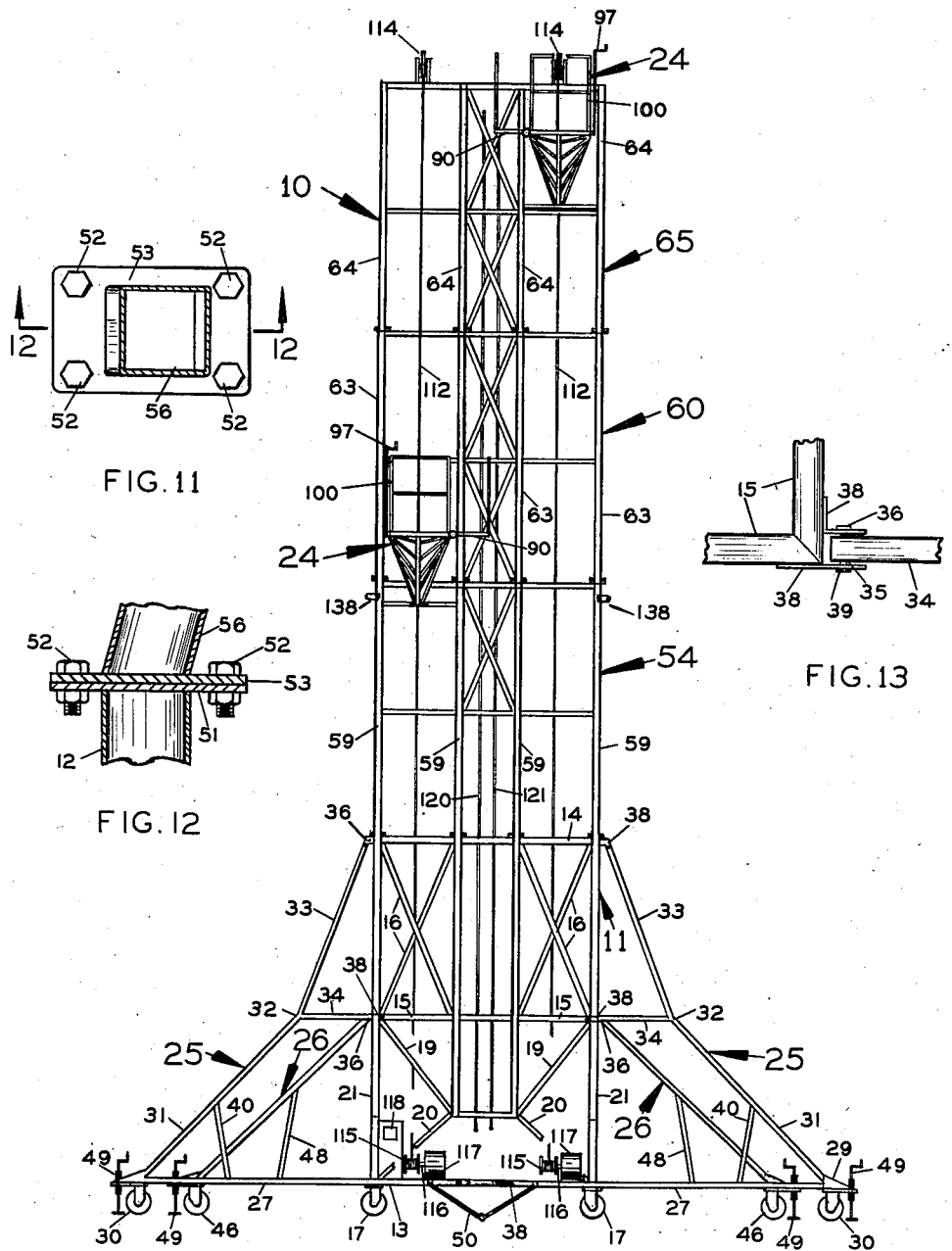
Figure 2 is a front elevational view thereof.

Each of the sections 11, 54, 60 and 65 is provided with a platform or landing 68 having securing plate members 69, similar in construction to the plate members 53, for bolting the landings 68 to securing plates 70 secured to each of the sections. The landings 68 with appropriate railings 71 removably mounted thereon as shown by Figures 1 and 5 are joined by ladders or stairs 72 which extend from the lower to the upper platforms 68. The ladders 72 are bolted to the platforms 68 so that they may be dismantled readily when the stand 10 is to be transported. Also a walk or further platform 73 with railings 74 are provided on each section connecting the platforms 68 and the catwalks 24 to permit a workman to gain access to the catwalks 24.

Figure 7:
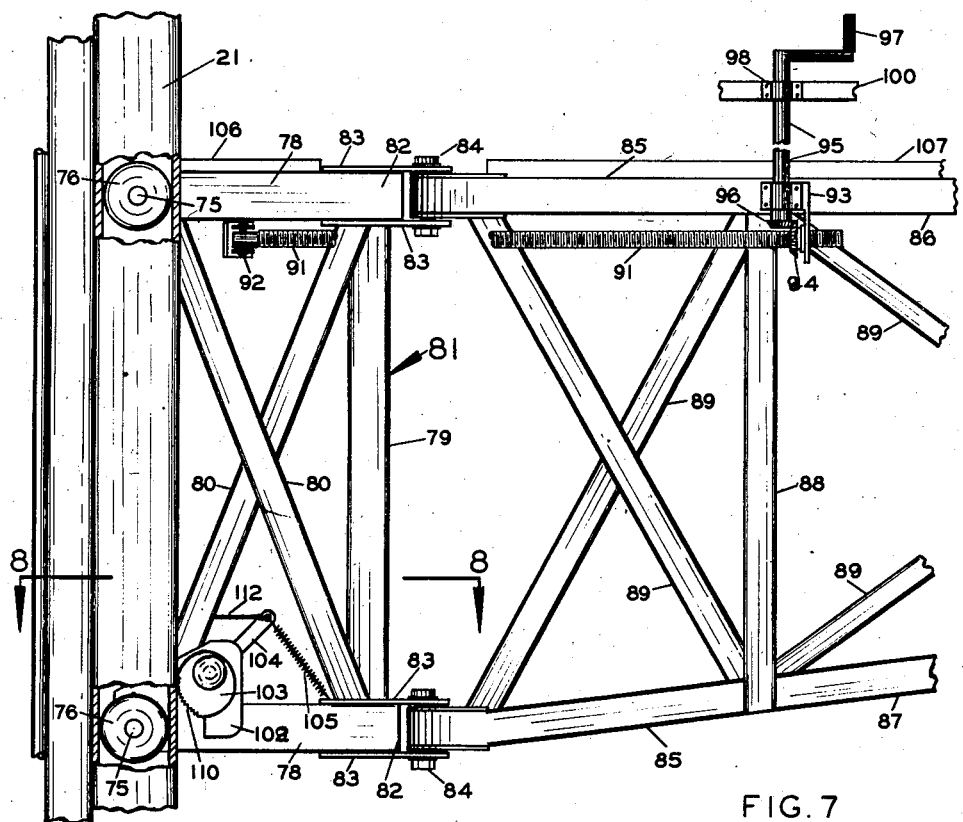
Figure 7 is a fragmentary detailed view in elevation of the catwalk and its support structure with parts broken away.
Figure 8:
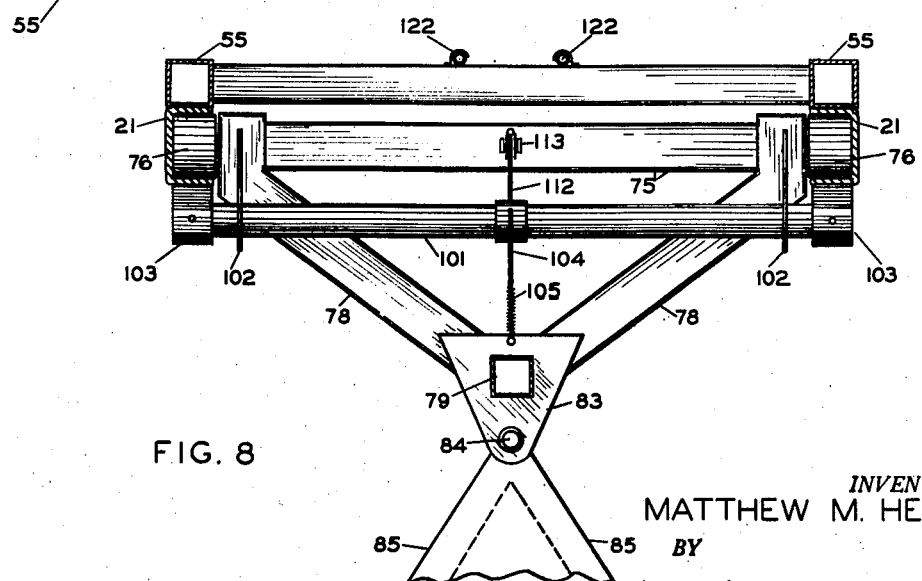
Figure 8 is a sectional view taken along the line 8—8 in Figure 7.

Extending horizontally between each pair of tracks is a pair of shafts 75 one above the other. (See Figures 6–8 inclusive.) Rotatably mounted on the ends of the shafts 75 and positioned within the tracks are rollers 76 for moving the catwalks 24 to any desired height. A pair of horizontal members 78 welded together at one end as at 82 at an obtuse angle have their other ends welded or otherwise secured to the ends of shaft housings 75' adjacent the rollers 76 to form a triangular carriage 81. An upright member 79 extends between the upper and lower members 78 at their end portions 82 with cross braces 80 extending between the horizontal members 78 on both sides of the triangular carriage 81. Means are provided for pivotally mounting the catwalks 24 onto the carriages 81 comprising a pivot plate 83 welded on each side of the junctures 82 with a pivot pin 84 extending through the pivot plates 83. The inner ends of the catwalks 24 are formed into a triangular shape by horizontal members 85, 85 joined at one end at an acute angle to each other where a bore is formed to receive the pin 84. The catwalks 24 are constructed in the form of a truss consisting of an upper beam 86 which forms the platform of the catwalk and a lower beam 87 with struts 88 and cross braces 89 extending between the beams 86 and 87. The outer ends of the horizontal members 85, 85 are joined to each of the upper and lower beams 86 and 87. The catwalks 24 are each provided with railings 100.

Figure 6:
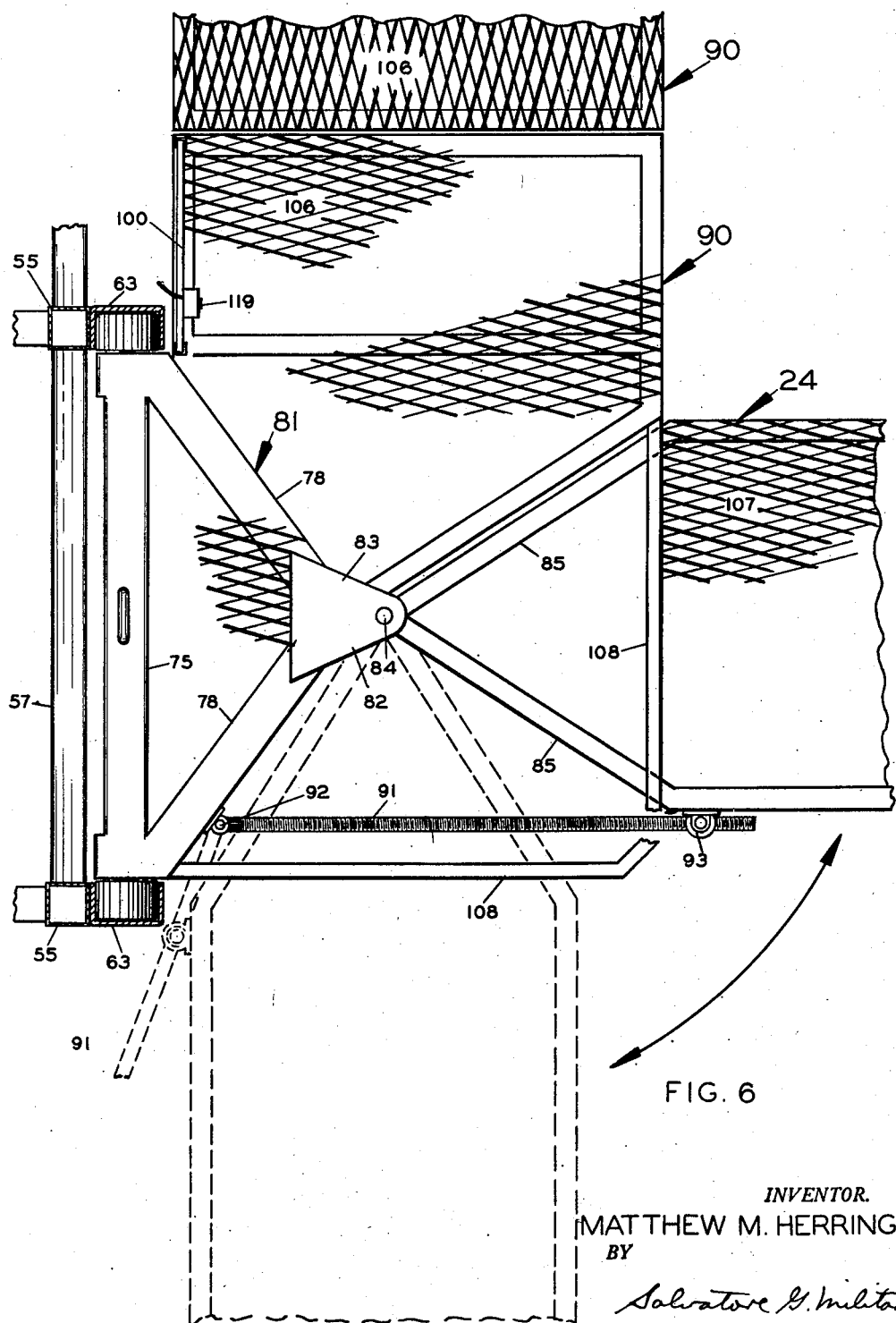
Figure 6 is a fragmentary cross sectional view taken along the line 6—6 of Figure 1 having only one of the pair of catwalks and support structures which are identical in construction.

In order to permit direct access from one catwalk to the other and to also increase the amount of available platform area, each of the carriages 81 is provided with a platform 90 (see Figure 6) which is secured to the upper horizontal member 78 and extends along the forward side of the sand 10 to a position approximately the center thereof in spaced relation to the other platform 90 in order to permit one platform 90 to pass by the other without interference. The platforms 90 are so constructed and mounted on the carriages 81 as best shown by Figure 6 that the catwalks 24 are able to pivot from the forward position shown in full line to the dotted line position wherein the catwalks 24 are extended to the side at which position the catwalks 24 are in alignment with each other permitting a person to walk from one catwalk 24 to the other. Means to swing the catwalks 24 horizontally and maintain them in any desired position comprises a screw or worm gear 91 pivoted at one end as at 92 to each of the outer horizontal members 78 of the upper group of the carriage 81. The other end of the worm gear 91 is threaded through a bevel gear 94 mounted on a carriage 93 whose other end is secured to the side of the catwalk 24. Also mounted on the carriage 93 is a vertical shaft 95 on whose lower end a bevel gear 96 is mounted in mesh engagement with the bevel gear 94. The upper end of the shaft 95 is provided with a crank 97 and a strap 98 securing the shaft 95 to the side of the railing 100. Upon the rotation of the crank 97, the shaft 95 and bevel gears 96 and 94 will rotate causing the bevel gear 94 and the carriage 93 to slide along the worm gear 91 and compel the worm gear 91 to swing about its pivot 92 and effect a swinging of the catwalk 24 on its pivot 84.

Also provided on each of the catwalks 24 is a brake system to prevent the downward movement of the carriage 81 in a free fall comprising a shaft 101 mounted by brackets 102 to the lower pair of members 78 in parallel relation to the shaft 75. To the ends of each of the shafts 101 adjacent the tracks 21 (see Figs. 7 and 8) there is mounted a cam disc 103 having a serrated surface 110 at the high point thereon. A lever 104 is secured to the brake shaft 101 and has a coil spring 105 secured to the free end thereof, with the other end of the coil spring 105 secured to one of the pivot plates 83. The coil spring 105 normally urges the brake shaft 101 cam disks 103 to rotate bringing the serrated surfaces 110 of the cam disks 103 into locked engagement with the outside leg of the tracks 21 thereby preventing any further downward movement or fall of the catwalk 24. A hood 109 is mounted about each of the cams 103.

Means are provided to permit workmen to walk on the platforms 90 and catwalks 24 comprising expanded metal sheets 106 and 107 mounted on the platforms 90 and carriage 81, and on the catwalk 24 respectively. The expanded metal sheet 106, which is substantially rectangular in shape rests on framework 108 which is secured to the platform 90 and carriage 81 above the members 85 to permit the catwalk 24 to swing thereunder.

The catwalks 24 are motivated by a line or cable 112 which is secured at one end to the free end of the levers 104 of each of the catwalks 24 passing under a pulley 113 secured to the top surface of the shaft housing 75 at approximately the mid portion thereof. The line 112 extends upwardly between the tracks to the top of the upper section 65 where it is wound about a sheave 114 mounted thereon and then extends downwardly to a drum 115 about which the line 112 is wound. The drum 115 is mounted on a shaft 116 of a motor 117. Each of the motors 117 are provided with a pair of switches 118, 119 mounted on the base section 11 and on the platform 90 of the catwalks 24 respectively so that each of the motors 117 may be operated from the base section 11 or the catwalks 24.

Each section 21, 54, 60 and 65 is provided with a pair of pipes 120, 121 for conveying water and chemicals therethrough. The pipes 120 and 121 are mounted on the inner surface of the front side of the stand 10 and at the juncture of each of the sections 11, 54, 60 and 65. They are provided with conventional pipe couplings to permit the disengagement of the pipes when the stand 10 is dismantled into its various sections. Likewise electric conduits 122 connecting the switches 118, 119 of each of the catwalks 24 are provided with connectors (not shown) at the junctures of the various sections so that they may be readily disconnected during the dismantling operation.

Figure 9:
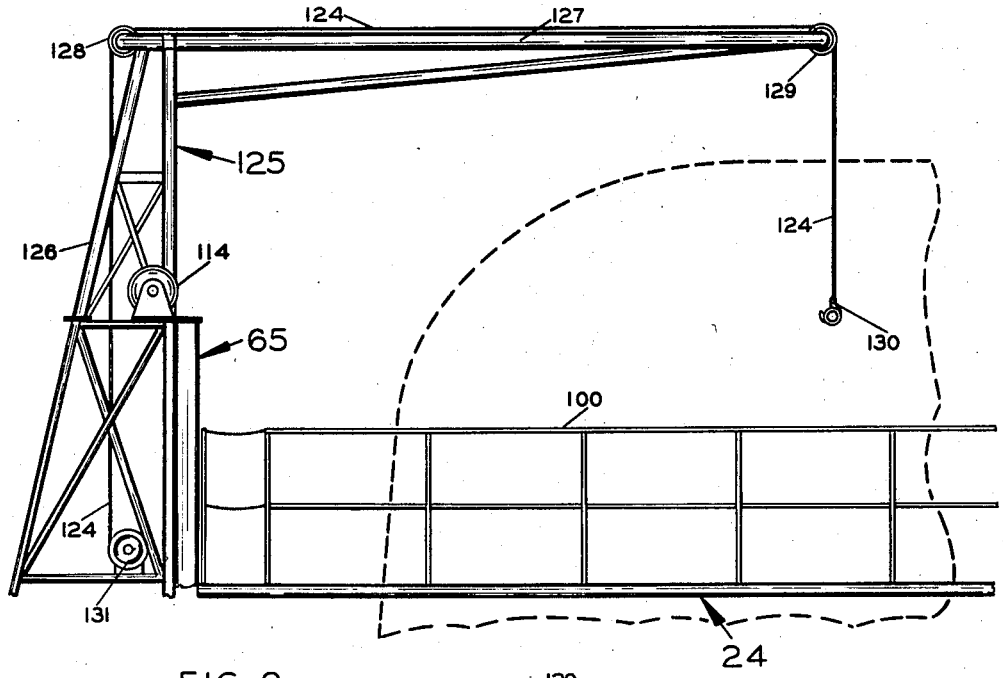
Figure 9 is a fragmentary side elevational view of a power hoist shown mounted on the top portion of the stand with a tail structure of an airplane shown in dotted lines.
Figure 10:
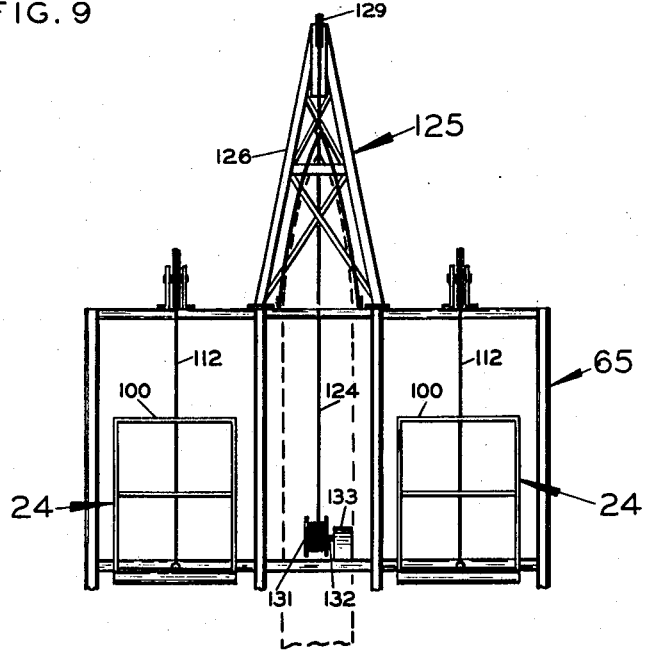
Figure 10 is a front elevational view thereof.

In order to render the stand 10 capable of removing a tail section or rudder of an aircraft or in lifting any heavy article, a power hoist 125 (see Figure 9) may be mounted on top of the topmost section 65 as shown by Figures 9 and 10. The hoist 125 consists of a supporting structure 126 on which is secured a boom 127 with pulleys 128 and 129 mounted thereon. A cable or line 124 on the free end of which a crane hook 130 is secured, is wound about the pulleys 129 and 128 and extends downwardly in the section 65 to a drum 131 mounted on a shaft 132 of a motor 133. Power for the motor 133 is taken from a switch box (not shown) mounted in the section 65. Also for lifting by hand such smaller items as buckets, brushes, etc., a small lift 134 may be mounted on the top of the section 65 at one side thereof. The lift 134 is provided with a pulley 135 about which is wound a line 136 at whose free end a hook 137 is secured. Also on the top portion of each of the upright members 55 and 56 of the intermediate section 54 there are mounted tie down hooks 138. In the event of a high wind, cables (not shown) secured at one end to the tie down hooks 138 may have their other ends secured at a distance from the base of the stand 10 to prevent the stand 10 from being overturned by the wind.

Figure 4:
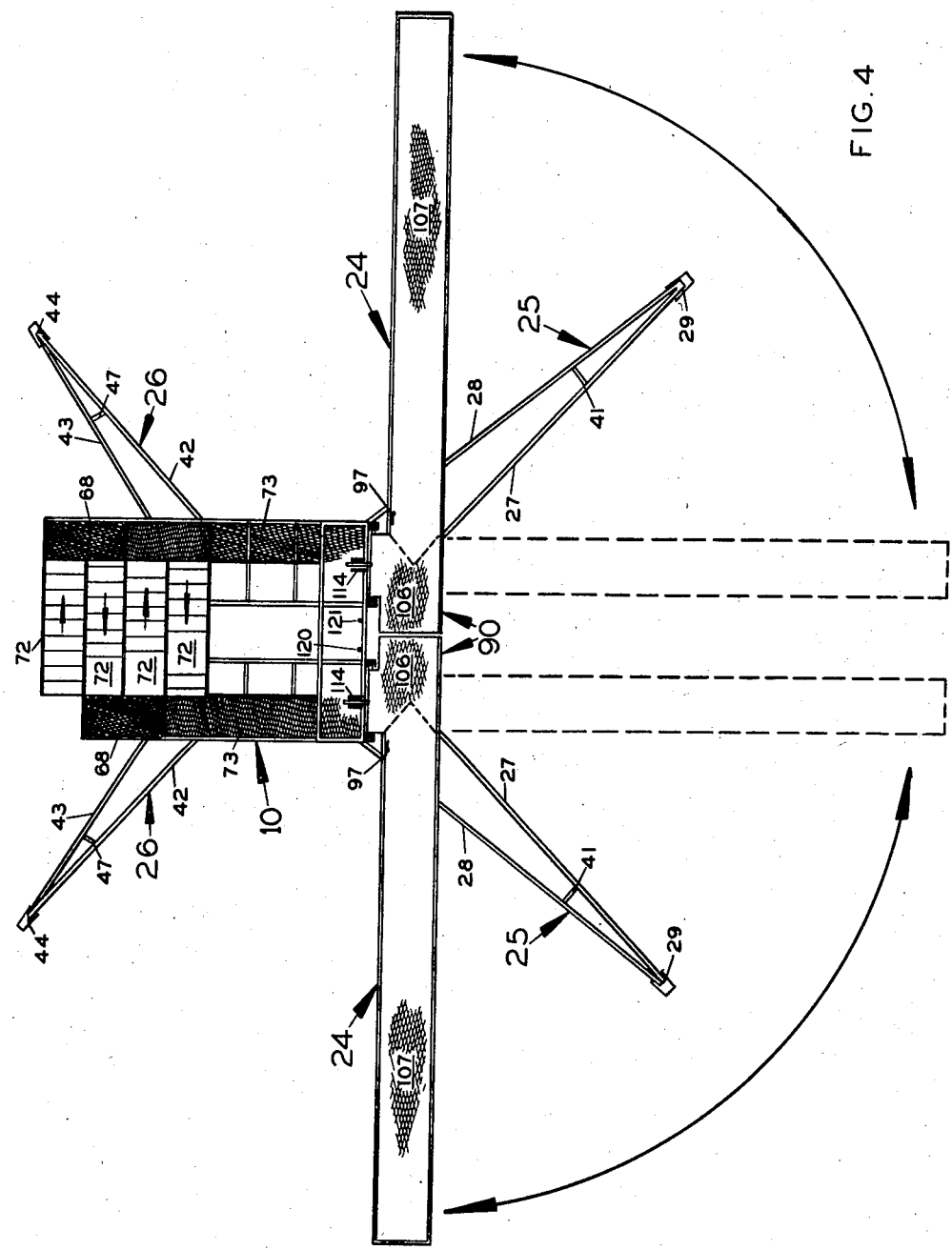
Figure 4 is a top plan view thereof with the dotted lines indicating the forward position of the catwalks.

When it is desired to utilize the empennage stand 10 all of the jacks 49 are adjusted so that the wheels rest on the pavement or ground. Then tow bars 50 are manned and the stand 10 is rolled into the appropriate position alongside an aircraft. When in position the jacks 49 are lowered until the stand 10 is stabilized and levelized and cannot move. Now, to operate each of the catwalks 24, a person may operate either the switch 118 or 119 raising or lowering the catwalks 24 to any desired elevated position. Then by rotating each of the cranks 97 to adjust the angular position of the catwalks 24 with relation to the stand 10 the platforms 24 will pivot about the pivot pins 84 and can swing from a forwardly extending position as seen in dotted lines by Figure 4 wherein the platforms 24 will lie in parallel relation to each other to a side extending position wherein the platforms are in alignment with each other as shown in full lines by Figure 4. With the platforms 24 in their most desirable positions, a person is able to reach the surfaces of the aircraft from the platform 24 even as to the lower surfaces of the tail structure as well as the topmost portion of its rudder. If the outer surfaces of the aircraft are to be washed, then hoses are connected to hose connectors (not shown) positioned at certain intervals along the full length of the pipes 120, 121. Although only water and chemical pipes 120 and 121 are shown, there may be more such pipes mounted on the stand 10 if such is found necessary. As the work on the aircraft progresses, the platforms 24 can be moved vertically or swung about its pivot 84 as explained hereinabove.

When it is desirable to dismantle the stand 10, the platforms 24 are slid downwardly until they are free of the lower end of the tracks 21. Cables 112 are then disengaged from the levers 104 and wound on their respective drums 115. Then the topmost railing 71, platform 68 and ladder 72 are unbolted and removed therefrom. The topmost section 65 is disengaged from the intermediate section 60 by removing the bolts 52 which secure the securing plates 66 and 67 together. The topmost section 65 is then removed from the stand as a unit as are the intermediate sections 60 and 54 and the platforms 68, railings 71 and ladders 72. The extensible leg portions 25 and 26 are then unbolted at the lugs 38 by the removal of the bolts 36. The stand 10 is now completely dismantled in sections small enough to be shipped or flown to a new locality where the sections are readily assembled.

It is to be understood that the form of my invention shown and described herein is to be taken as a preferred embodiment of the same and that various changes may be made in the shape, size and arrangement of parts without departing from the spirit of my present invention on the scope of the subjoined claims.

What I claim as new is:

1. In an empennage stand for aircraft having an upright support structure and a plurality of pairs of vertically disposed tracks mounted on said upright support structure, the combination comprising a carriage movably mounted in each pair of said tracks, said carriages extending horizontally from said support, a plurality of elongated catwalks, pivot means mounting one end of each of said catwalks to the outer end of said carriages, a platform mounted on each of said carriages, said platforms extending to a position intermediate said pairs of tracks whereby a continuous passageway is provided between said catwalks.

2. In an empennage stand for aircraft having an upright support structure, and a plurality of pairs of vertically disposed tracks mounted on said upright support structure, the combination comprising a pair of rollers adapted to be mounted in each pair of said tracks, horizontally disposed shaft means extending between said rollers, a pair of horizontally disposed members secured to each of said shaft means at one end and secured together at their other ends, a plurality of catwalks each having a substantially triangular end portion, pivot means securing said other ends of said horizontally disposed members and each of said catwalks at said substantially triangular end portion whereby said catwalks are adapted to be swung through an arc of substantially 90 degrees, a platform mounted on said horizontally disposed members and extending to a position intermediate said pairs of vertically disposed tracks whereby a continuous passageway is provided between said catwalks.

References Cited in the file of this patent

UNITED STATES PATENTS

| | | |
|---|---|---|
| 182,380 | Miller | Sept. 19, 1876 |
| 1,114,718 | Audet | Oct. 27, 1914 |
| 2,066,221 | Payne | Dec. 29, 1936 |
| 2,187,283 | Scheutz | Jan. 16, 1940 |
| 2,354,905 | Bailey | Aug. 1, 1944 |
| 2,471,492 | Moore | May 1, 1949 |
| 2,570,076 | Sims | Oct. 2, 1951 |
| 2,606,078 | Brock | Aug. 5, 1952 |
| 2,614,893 | Merrill et al. | Oct. 21, 1952 |
| 2,699,879 | Bertram | Jan. 18, 1955 |

FOREIGN PATENTS

| | | |
|---|---|---|
| 1,461 | Great Britain | Jan. 18, 1902 |
| 690,736 | France | June 24, 1930 |